US008745017B2

(12) United States Patent
Long et al.

(10) Patent No.: US 8,745,017 B2
(45) Date of Patent: Jun. 3, 2014

(54) TRANSACTION-AWARE CACHING FOR ACCESS CONTROL METADATA

(75) Inventors: David J. Long, Walnut Creek, CA (US); David B. Pitfield, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 910 days.

(21) Appl. No.: 12/049,212

(22) Filed: Mar. 14, 2008

(65) Prior Publication Data

US 2008/0162485 A1 Jul. 3, 2008

Related U.S. Application Data

(60) Division of application No. 10/452,163, filed on May 30, 2003, now Pat. No. 7,421,541, which is a continuation-in-part of application No. 09/853,823, filed on May 11, 2001, now Pat. No. 7,185,005.

(60) Provisional application No. 60/204,196, filed on May 12, 2000.

(51) Int. Cl.
*G06F 7/00* (2006.01)

(52) U.S. Cl.
USPC ............................................. 707/705

(58) Field of Classification Search
USPC ............ 707/999.002, 999.003, 999.004, 707/999.101, 999.102, 705
See application file for complete search history.

(56) References Cited

U.S. PATENT DOCUMENTS

| | | | |
|---|---|---|---|
| 4,755,930 A | 7/1988 | Wilson et al. | |
| 5,151,989 A * | 9/1992 | Johnson et al. | ........................ 1/1 |
| 5,222,242 A | 6/1993 | Choi et al. | |
| 5,303,362 A | 4/1994 | Butts et al. | |
| 5,313,629 A | 5/1994 | Abraham et al. | |
| 5,327,556 A | 7/1994 | Mohan et al. | |
| 5,388,257 A | 2/1995 | Bauer | |
| 5,390,318 A * | 2/1995 | Ramakrishnan et al. | ...... 711/158 |
| 5,437,029 A | 7/1995 | Sinha | |
| 5,457,793 A | 10/1995 | Elko et al. | |
| 5,544,345 A | 8/1996 | Carpenter et al. | |
| 5,729,689 A | 3/1998 | Allard et al. | |
| 5,778,179 A | 7/1998 | Kanai et al. | |
| 5,799,305 A | 8/1998 | Bortvedt et al. | |
| 5,842,214 A | 11/1998 | Whitney et al. | |
| 5,852,747 A * | 12/1998 | Bennett et al. | .................. 710/40 |
| 5,864,870 A | 1/1999 | Guck | |
| 5,870,757 A | 2/1999 | Fuller | |

(Continued)

OTHER PUBLICATIONS

Oracle® Internet File System™ Developer's Guide Release 1.1, Part No. A75172-04 (2000) 90 pages.

(Continued)

*Primary Examiner* — Hosain Alam
*Assistant Examiner* — Eliyah S Harper
(74) *Attorney, Agent, or Firm* — Hickman Palermo Truong Becker Bingham Wong LLP

(57) ABSTRACT

Techniques are provided for performing transaction-aware caching of metadata in an electronic file system. A mechanism is described for providing transaction-aware caching that uses a cache hierarchy, where the cache hierarchy includes uncommitted caches associated with sessions in an application and a committed cache that is shared among the sessions in that application. Techniques are described for caching document metadata, access control metadata and folder path metadata. Also described is a technique for using negative cache entries to avoid unnecessary communications with a server when applications repeatedly request non-existent data.

30 Claims, 7 Drawing Sheets

(56) References Cited

U.S. PATENT DOCUMENTS

| | | | |
|---|---|---|---|
| 5,873,093 A | 2/1999 | Williamson et al. | |
| 5,878,411 A | 3/1999 | Burroughs et al. | |
| 5,893,086 A | 4/1999 | Schmuck et al. | |
| 5,937,406 A | 8/1999 | Balabine et al. | |
| 5,956,506 A | 9/1999 | Cobb et al. | |
| 5,964,886 A | 10/1999 | Slaughter et al. | |
| 6,021,414 A | 2/2000 | Fuller | |
| 6,044,224 A | 3/2000 | Radia et al. | |
| 6,055,527 A | 4/2000 | Badger et al. | |
| 6,073,129 A | 6/2000 | Levine et al. | |
| 6,115,703 A | 9/2000 | Bireley et al. | |
| 6,119,151 A | 9/2000 | Cantrell et al. | |
| 6,173,292 B1 | 1/2001 | Barber et al. | |
| 6,209,000 B1 | 3/2001 | Klein et al. | |
| 6,216,212 B1 | 4/2001 | Challenger et al. | |
| 6,279,007 B1 | 8/2001 | Uppala | |
| 6,298,478 B1 | 10/2001 | Nally et al. | |
| 6,308,168 B1 * | 10/2001 | Dovich et al. | 1/1 |
| 6,324,581 B1 | 11/2001 | Xu et al. | |
| 6,324,623 B1 | 11/2001 | Carey | |
| 6,330,573 B1 | 12/2001 | Salisbury et al. | |
| 6,345,382 B1 | 2/2002 | Hughes | |
| 6,385,644 B1 * | 5/2002 | Devine et al. | 709/206 |
| 6,427,123 B1 | 7/2002 | Sedlar | |
| 6,457,017 B2 | 9/2002 | Watkins et al. | |
| 6,457,065 B1 | 9/2002 | Rich et al. | |
| 6,473,407 B1 * | 10/2002 | Ditmer et al. | 370/252 |
| 6,487,547 B1 * | 11/2002 | Ellison et al. | 707/600 |
| 6,502,102 B1 * | 12/2002 | Haswell et al. | 1/1 |
| 6,513,056 B1 | 1/2003 | Copeland et al. | |
| 6,535,970 B1 | 3/2003 | Bills et al. | |
| 6,549,916 B1 | 4/2003 | Sedlar | |
| 6,625,602 B1 | 9/2003 | Meredith et al. | |
| 6,631,402 B1 * | 10/2003 | Devine et al. | 709/217 |
| 6,697,846 B1 | 2/2004 | Soltis | |
| 6,701,514 B1 * | 3/2004 | Haswell et al. | 717/115 |
| 6,769,124 B1 | 7/2004 | Schoening et al. | |
| 6,792,436 B1 | 9/2004 | Zhu et al. | |
| 6,886,080 B1 | 4/2005 | Carey | |
| 6,922,708 B1 | 7/2005 | Sedlar | |
| 6,947,991 B1 * | 9/2005 | Burton et al. | 709/227 |
| 6,970,975 B2 | 11/2005 | Frank | |
| 6,973,455 B1 * | 12/2005 | Vahalia et al. | 1/1 |
| 7,031,956 B1 | 4/2006 | Lee et al. | |
| 7,043,472 B2 | 5/2006 | Aridor et al. | |
| 7,047,253 B1 | 5/2006 | Murthy et al. | |
| 7,100,195 B1 * | 8/2006 | Underwood | 726/2 |
| 7,171,407 B2 | 1/2007 | Barton et al. | |
| 7,185,013 B2 | 2/2007 | Burnett | |
| 7,203,709 B2 | 4/2007 | Long et al. | |
| 7,228,299 B1 | 6/2007 | Harmer et al. | |
| 7,359,934 B1 | 4/2008 | Ricart et al. | |
| 7,630,971 B2 | 12/2009 | Arrouye et al. | |
| 7,752,226 B1 | 7/2010 | Harmer et al. | |
| 2002/0103829 A1 | 8/2002 | Manning et al. | |
| 2002/0107835 A1 | 8/2002 | Coram et al. | |
| 2002/0188613 A1 | 12/2002 | Chakraborty et al. | |
| 2003/0033285 A1 | 2/2003 | Jalali et al. | |
| 2003/0131051 A1 | 7/2003 | Lection et al. | |
| 2003/0195866 A1 | 10/2003 | Long et al. | |
| 2003/0200197 A1 | 10/2003 | Long et al. | |
| 2004/0148278 A1 | 7/2004 | Milo et al. | |
| 2004/0205551 A1 | 10/2004 | Santos | |
| 2004/0267760 A1 | 12/2004 | Brundage et al. | |
| 2005/0289125 A1 | 12/2005 | Liu et al. | |
| 2006/0059204 A1 | 3/2006 | Borthakur et al. | |
| 2006/0074925 A1 | 4/2006 | Bixby et al. | |
| 2006/0129584 A1 | 6/2006 | Hoang et al. | |

OTHER PUBLICATIONS

Dourish, Paul et al., "Extending Document Management Systems with User-Specific Active Properties," ACM transactions on Information Systems, vol. 18, No. 2, Apr. 2000, pp. 140-170.

Balter, A., "Alison Balter's Mastering Access 97 Development" *Sams Publishing* (1997) Chapter 22, pp. 1-4.

"Mapping a Relational Database to a Hierarchical File System" *IBM* (1995) 3 pages.

\* cited by examiner

TRANSACTION-AWARE CACHING FOR ACCESS CONTROL METADATA

PRIORITY CLAIM AND CROSS-REFERENCE TO RELATED APPLICATIONS

This application claims benefit and priority under 35 U.S.C. §120 as a Divisional of U.S. patent application Ser. No. 10/452,163, filed by David J. Long et al. on May 30, 2003 now U.S. Pat. No. 7,421,541, the entire contents of which is hereby incorporated by reference as if fully set forth herein, and which is a continuation-in-part application and claims the benefit of priority under 35 U.S.C. §120 from U.S. patent application Ser. No. 09/853,823, filed by David J. Long et al. on May 11, 2001 now U.S. Pat. No. 7,185,005, the entire contents of which is hereby incorporated by reference for all purposes as if fully set forth herein, and which is related to and claims priority from prior U.S. Provisional Application Ser. No. 60/204,196, filed by David J. Long et al. on May 12, 2000 and entitled "Techniques and Features of an Internet File System", the entire contents of which is hereby incorporated by reference for all purposes as if fully set forth herein.

This application is related to U.S. application Ser. No. 10/448,888 filed by David J. Long et al. on May 30, 2003, the entire contents of which is hereby incorporated by reference for all purposes as if fully set forth herein.

This application is related to U.S. application Ser. No. 10/452,164 filed on May 30, 2003, which issued as U.S. Pat. No. 7,203,709 on Apr. 10, 2007 to David J. Long et al., the entire contents of which is hereby incorporated by reference for all purposes as if fully set forth herein.

FIELD OF THE INVENTION

The present invention relates to electronic file systems, and in particular to transaction-aware caching of file system metadata for electronic file systems.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional operating systems, for example, provide file systems that use hierarchy-based organization principles. Specifically, a typical operating system file system ("OS file system") has folders arranged in a hierarchy, and documents stored in the folders. Ideally, the hierarchical relationships between the folders reflect some intuitive relationship between the meanings that have been assigned to the folders. Similarly, it is ideal for each document to be stored in a folder based on some intuitive relationship between the contents of the document and the meaning assigned to the folder in which the document is stored.

Recently, techniques have been developed to use a relational database to store files that have traditionally been stored in OS file systems. By storing the files in a relational database, the files may be accessed by issuing database commands to a database server. In many circumstances, retrieving and manipulating files by issuing database commands can be much more efficient than by issuing file system commands due to the enhanced functionality of database servers. One system in which a relational database is used as the back end of a file system is described in U.S. patent application Ser. No. 09/571,508, entitled "Multi-Model Access to Data", filed on May 15, 2000 by Eric Sedlar, the entire contents of which are incorporated herein by this reference. In the Sedlar system, the files are accessible both (1) by making calls to conventional file system APIs, and (2) by issuing queries to the database server.

A transaction is an "all or nothing" unit of work. Changes made by operations that belong to a transaction are not made permanent until all changes in the transaction are successfully made and the transaction commits. If any operation within a transaction fails, then all changes made by the transaction are undone. The removal of changes made by a transaction is referred to as a "rollback" operation.

When an OS file system is implemented using a relational database system, a series of file system operations may be performed as a transaction within the database system. Techniques for performing file system operations as a transaction are described in U.S. patent application Ser. No. 09/571,496, entitled "File System that Supports Transactions", filed on May 15, 2000, by Eric Sedlar, the entire contents of which are incorporated herein by this reference.

One of the difficult problems associated with using a database as part of a file system is the performance overhead of accessing the database every time information about files that are stored in the file system is required. Such information about files is generally referred to as the file system "metadata". Examples of metadata associated with files are: (1) a document's name, creation date, last modified date (2) permissions for accessing the document, and (3) the folder path for accessing the document.

Furthermore, in a file system that supports transactions, the "metadata" that is supplied to an entity needs to be based on the context of that entity. For example, if a first entity is in the middle of a transaction that has changed the filename of a file, the first entity should be supplied the new filename even though the transaction has not yet completed. However, a second entity that is not involved in that transaction should be supplied the old filename, since the transaction that changed the filename has not yet committed.

Based on the foregoing, it is clearly desirable to provide techniques that reduce the overhead associated with accessing a database to retrieve metadata associated with files that are stored within a database system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for transaction-aware caching for metadata. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architectural Overview

Figure 1:
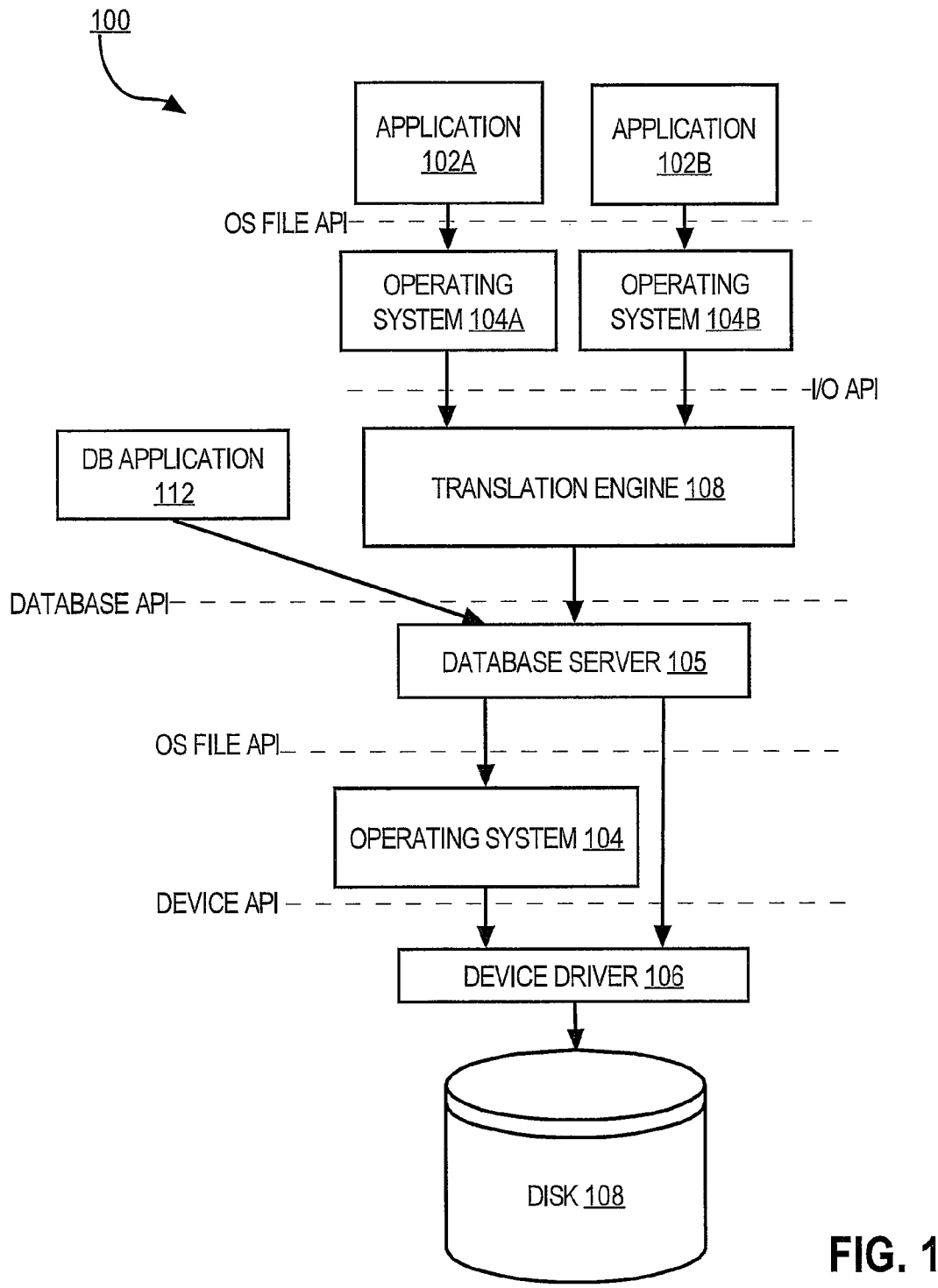
FIG. 1 is a block diagram of a system for managing files using a database system according to an embodiment of the invention.

FIG. 1 is a block diagram that illustrates the architecture of a system 100 implemented according to an embodiment of the invention. System 100 includes a database server 105 that provides a database API through which a database application 112 can access data managed by database server 105. From the perspective of all entities that access data managed by database server 105 through the database API, the data managed by database server 105 is stored in relational tables that can be queried using the database language supported by database server 105 (e.g. SQL). Transparent to those entities, database server 105 stores the data to disk 108. According to one embodiment, database server 105 implements disk management logic that allows it to store the data directly to disk and thus avoid the overhead associated with the OS file system of operating system 104. Thus, database server 105 may cause the data to be stored to disk either by (1) making calls to the OS file system provided by operating system 104, or (2) storing the data directly to disk, thus circumventing operating system 104.

System 100 provides a translation engine 108 that translates I/O commands received from operating systems 104a and 104b into database commands that the translation engine 108 issues to database server 105. When the I/O commands call for the storage of data, translation engine 108 issues database commands to database server 105 to cause the data to be stored in relational tables managed by database server 105. When the I/O commands call for the retrieval of data, translation engine 108 issues database commands to database server 105 to retrieve data from relational tables managed by database server. Translation engine 108 then provides the data thus retrieved to the operating system that issued the I/O commands.

The Translation Engine

Figure 2:
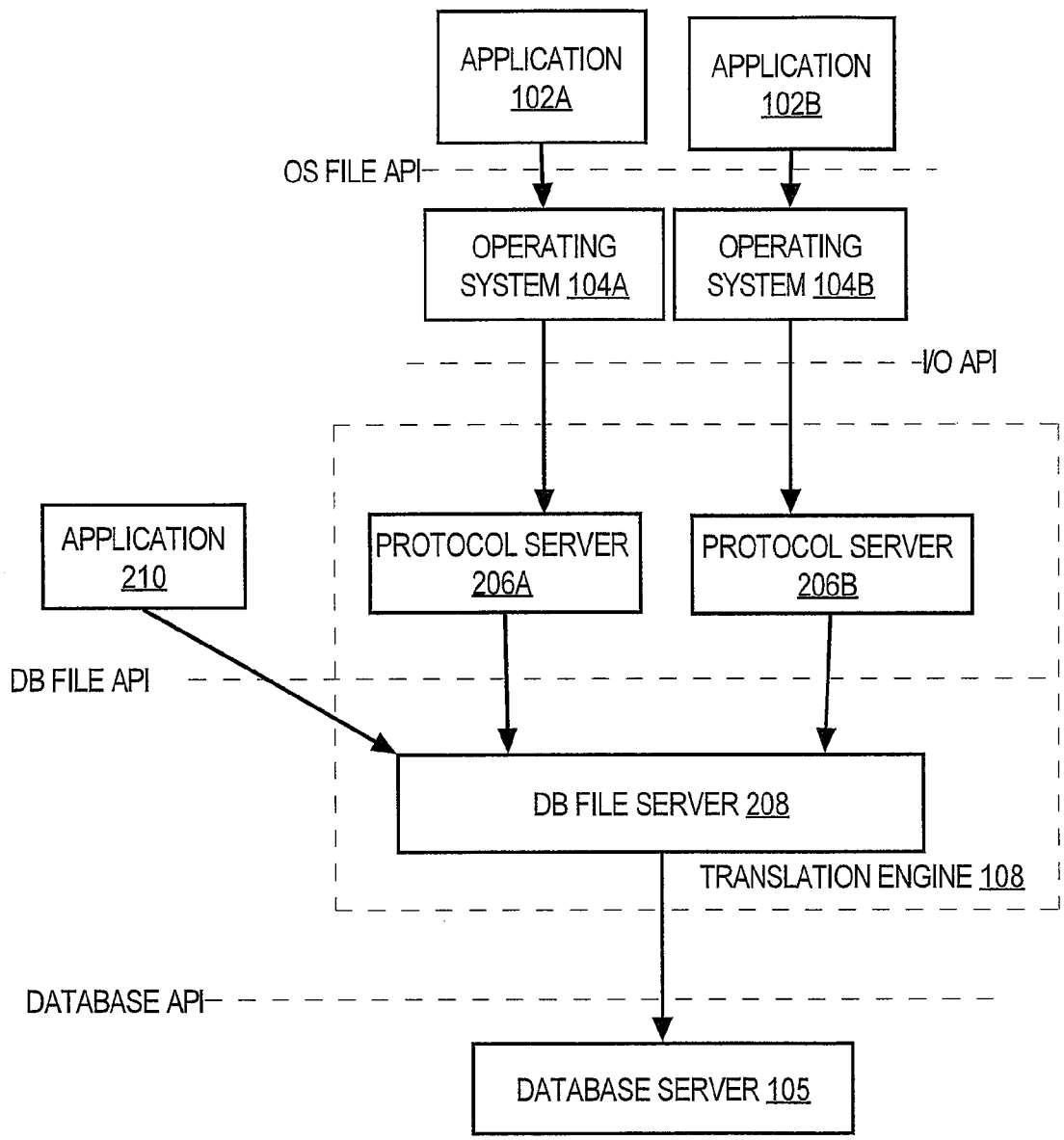
FIG. 2 is a block diagram that illustrates the translation engine of FIG. 1 in greater detail.

According to one embodiment of the invention, translation engine 108 is designed in two layers. Those layers are illustrated in FIG. 2. Referring to FIG. 2, translation engine 108 includes a protocol server layer, and a DB file server 208 layer. DB file server 208 allows applications to access data stored in the database managed by database server 105 through an alternative API, referred to herein as the DB file API. The DB file API combines aspects of both an OS file API and the database API. Specifically, the DB file API supports file operations similar to those supported by conventional OS file APIs.

However, unlike OS file APIs, the DB file API incorporates the database API concept of transactions. That is, the DB file API allows applications to specify that a set of file operations are to be performed as an atomic unit.

DB File Server

The DB file server 208 is responsible for translating DB file API commands to database commands. The DB file API commands received by DB file server 208 may come from the protocol server layer of translation engine 108, or directly from applications (e.g. application 210) specifically designed to perform file operations by issuing calls through the DB file API.

According to one embodiment, DB file server 208 is object oriented. Thus, the routines supplied by DB file server 208 are invoked by instantiating an object and calling methods associated with the object. In one implementation, the DB file server 208 defines a "transaction" object class that includes the following methods: insert, save, update, delete, commit and roll-back. The DB file API provides an interface that allows external entities to instantiate and use the transaction object class.

Specifically, when an external entity (e.g. application 210 or a protocol server) makes a call to DB file server 208 to instantiate a transaction object, DB file server 208 sends a database command to database server 105 to begin a new transaction. The external entity then invokes the methods of the transaction object. The invocation of a method results in a call to DB file server 208. DB file server 208 responds to the call by issuing corresponding database commands to database server 105. All database operations that are performed in response to the invocation of methods of a given transaction object are performed as part of the database transaction associated with the given transaction object.

Significantly, the methods invoked on a single transaction object may involve multiple file operations. For example, application 210 may interact with DB file server 208 as follows: Application 210 instantiates a transaction object TXO1 by making a call through the DB file API. In response, DB file server 208 issues a database command to start a transaction TX1 within database server 105. Application 210 invokes the update method of TXO1 to update a file F1 stored in the database managed by database server 105. In response, DB file server 208 issues a database command to database server 105 to cause the requested update to be performed as part of transaction TX1. Application 210 invokes the update method of TXO1 to update a second file A1 stored in the database managed by database server 105. In response, DB file server 208 issues a database command to database server 105 to cause the requested update to be performed as part of transaction TX1. Application 210 then invokes the commit method of TXO1. In response, DB file server 208 issues a database command to database server 105 to cause TX1 to be committed. If the update to file A1 had failed, then the roll-back method of TXO1 is invoked and all changes made by TX1, including the update to file F1, are rolled back.

While techniques have been described herein with reference to a DB file server that uses transaction objects, other implementations are possible. For example, within the DB file server, objects may be used to represent files rather than transactions. In such an implementation, file operations may be performed by invoking the methods of the file objects, and passing thereto data that identifies the transaction in which the operations are to be executed. Thus, the present invention is not limited to a DB file server that implements any particular set of object classes.

For the purpose of explanation, the embodiment illustrated in FIG. 2 shows DB file server 208 as a process executing outside database server 105 that communicates with database server 105 through the database API. However, according to an alternative embodiment, the functionality of DB file server 208 is built into database server 105. By building DB file server 208 into database server 105, the amount of inter-process communication generated during the use of the DB file system is reduced. The database server produced by incorporating DB file server 208 into database server 105 would therefore provide two alternative APIs for accessing data managed by the database server 105: the DB file API and the database API (SQL).

Protocol Servers

The protocol server layer of translation engine 108 is responsible for translating between specific protocols and DB file API commands. For example, protocol server 206a translates I/O commands received from operating system 104a to DB file API commands that it sends to DB file server 208. Protocol server 206a also translates DB file API commands received from DB file server 208 to I/O commands that it sends to operating system 104a.

In practice, there is not a one-to-one correspondence between protocols and operating systems. Rather, many operating systems support more than one protocol, and many protocols are supported by more then one operating system. For example, a single operating system may provide native support for one or more of network file protocols (SMB, FTP, NFS), e-mail protocols (SMTP, IMAP4), and web protocols (HTTP). Further, there is often an overlap between the sets of protocols that different operating systems support. However, for the purpose of illustration, a simplified environment is shown in which operating system 104A supports one protocol, and operating system 104b supports a different protocol.

The I/O API

As mentioned above, protocol servers are used to translate I/O commands to DB file commands. The interface between the protocol servers and the OS file systems with which they communicate is generically labeled I/O API. However, the specific I/O API provided by a protocol server depends on both (1) the entity with which the protocol server communicates, and (2) how the protocol server is to appear to that entity. For example, operating system 104a may be Microsoft Windows NT, and protocol server 206a may be designed to appear as a device driver to Microsoft Windows NT. Under those conditions, the I/O API presented by protocol server 206a to operating system 104a would be a type of device interface understood by Windows NT. Windows NT would communicate with protocol server 206a as it would any storage device. The fact that files stored to and retrieved from protocol server 206a are actually stored to and retrieved from a database maintained by database server 105 is completely transparent to Windows NT.

While some protocol servers used by translation engine 108 may present device driver interfaces to their respective operating systems, other protocol servers may appear as other types of entities. For example, operating system 104a may be the Microsoft Windows NT operating system and protocol server 206a presents itself as a device driver, while operating system 104b is the Microsoft Windows 95 operating system and protocol server 206b presents itself as a System Message Block (SMB) server. In the latter case, protocol server 206b would typically be executing on a different machine than the operating system 104b, and the communication between the operating system 104b and protocol server 206b would occur over a network connection.

In the examples given above, the source of the I/O commands handled by the protocol servers are OS file systems. However, translation engine 108 is not limited to use with OS file system commands. Rather, a protocol server may be provided to translate between the DB file commands and any type of I/O protocol. Beyond the I/O protocols used by OS file systems, other protocols for which protocol servers may be provided include, for example, the File Transfer Protocol (FTP) and the protocols used by electronic mail systems (POP3 or IMAP4).

Just as the interface provided by the protocol servers that work with OS file systems is dictated by the specific OS, the interface provided by the protocol servers that work with non-OS file systems will vary based on the entities that will be issuing the I/O commands. For example, a protocol server configured receive I/O commands according to the FTP protocol would provide the API of an FTP server. Similarly, protocol servers configured to receive I/O commands according to the HTTP protocol, the POP3 protocol, and the IMAP4 protocol, would respectively provide the APIs of an HTTP server, a POP3 server, and an IMAP4 server.

Similar to OS file systems, each non-OS file protocol expects certain attributes to be maintained for its files. For example, while most OS file systems store data to indicate the last modified date of a file, electronic mail systems store data for each e-mail message to indicate whether the e-mail message has been read. The protocol server for each specific protocol implements the logic required to ensure that the semantics its protocol are emulated in the document system.

Caching File System Metadata

In a system where files are maintained within a database, each file system operation typically results in a call to a database server that manages the database. For example, when application 102A requests a contents listing of a folder, the request is translated by translation engine 108 into one or more calls made to database server 105. Database server 105 performs the operations specified in the calls, and returns the contents listing information.

Unfortunately, the efficiency of the file operations is diminished by the fact that even trivial operations may result in calls to the database server 105. Therefore, according to one embodiment of the invention, techniques are provided for caching, outside the database server, various of pieces of information associated with the files that are stored in the database. For example, a file system metadata cache may be maintained in database file server 208. By maintaining a cache of file system metadata within database file server 208, it is possible for database file server 208 to provide the file system information requested by applications to the applications without having to always involve the database server 105.

For the purpose of explanation, an embodiment shall be described in which a file metadata cache is maintained in the database file server 208. However, the techniques described herein may be used to maintain a file metadata cache anywhere outside the database, to reduce the frequency in which the database server 105 must be involved in file system operations.

Types of Object Metadata

File systems typically store many types of objects, such as folders, files, permissions, user objects, group objects, Access Control Lists ("ACLs") and Access Control Entries ("ACEs"), etc. Similarly, there are several different types of object metadata. For example, one type of object metadata represents attributes of the object. Such attributes frequently convey information about an object's content or history. Such metadata may include, for example, the name of the object, the type of the object, the creation date of the object, the most recent modification date of the object, various pointers to other objects, etc. This form of metadata is referred to herein as "attribute metadata".

Another type of object metadata represents information about who can access objects, and what forms of access they are allowed. For example, one user may be able to read and write to a particular object. A second user may only be allowed to read the object. A third user may not even be allowed to know that the object exists. This form of metadata is referred to herein as "permission metadata".

Yet another type of object metadata represents information about where, within a file system, an object is stored. In hierarchical file systems, the location of an object within the hierarchy is often represented by a folder path. For example, if a object "X" is located directly below a object "Y" in the file hierarchy, object "Y" is directly located below object "Z", and object "Z" is at the root of the file hierarchy, then the path to "X" may be represented as "/Z/Y/X". A folder path may be represented by a string, such as "/A1/A1-1/A1-1-3/doc1.java". In the folder path "/A1/A1-1/A1-1-3/doc1.java", the substring "doc1.java" is the name of a document stored in the file system. In the folder path "/A1/A1-1/A1-1-3/doc1.java", the substring "A1" is an example of one token in the folder path. This form of metadata is referred to herein as "path metadata".

While three specific types of metadata (attribute metadata, permission metadata and path metadata) are specifically addressed hereafter, the techniques described herein may be applied to caching all types of metadata relating to file system objects.

Cache Hierarchy

Figure 4:
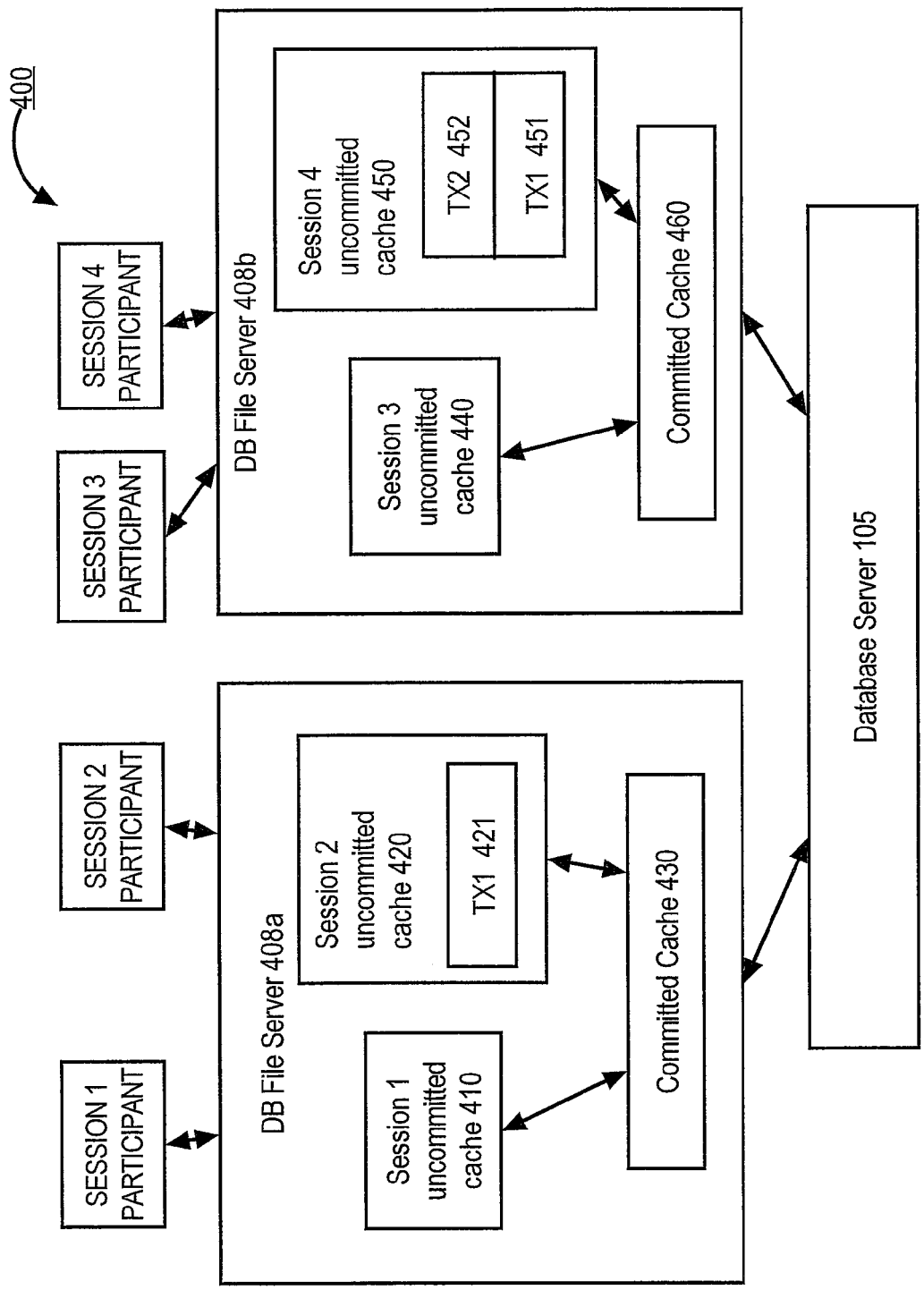
FIG. 4 is a block diagram of a cache hierarchy in a system.

Techniques are described herein for improving the performance of a system that stores files within a database by maintaining a cache of object metadata external to the database server that is managing the file system objects with which the metadata is associated. According to one embodiment, such object metadata is cached in a cache hierarchy that is made up of one or more separate caches for sessions, transactions and applications. FIG. 4 is a block diagram depicting a system 400 that includes a cache hierarchy for caching metadata according to an embodiment of the invention.

Referring to FIG. 4, system 400 includes DB file servers 408a and 408b that serve as intermediaries between the database server 105 and session participants. The session participants generally represent any entities that communicate with DB file servers to perform file system operations on documents maintained in a database managed by database server 105. The session participants may include, for example, application 210 shown in FIG. 2.

Multiple levels of metadata cache are maintained within each of DB file servers 408a and 408b. In the illustrated embodiment, each DB file server maintains a committed cache (430 and 460) at one level, and uncommitted caches (410, 420, 440 and 450) at another level.

The committed cache is shared among all sessions using a particular DB File Server, and stores data that has been committed to the database. For example, committed cache 460 is shared among sessions being handled by DB file server 408b.

In addition to sharing the committed cache, each session may have its own uncommitted cache. The uncommitted cache for a session serves to cache object metadata that has been changed within the session but not yet committed to the database. For example, uncommitted cache 440 corresponds to session 3, and is used to store object metadata that has been changed within session 3 that has not yet been committed to the database.

According to one embodiment that supports nested transactions, there are one or more transaction frames within each of the uncommitted caches, where each frame corresponds to a nesting level within a nested transaction. For example, session 4 may involve the nested transaction where a transaction TX2 is nested within a transaction TX1. At the time where TX2 has been started but not yet competed, the uncommitted cache 450 of session 4 will have one transaction frame 451 for TX1 and another transaction from 452 for transaction TX2.

This cache hierarchy enables transaction-aware caching by separating modified metadata on a per session basis from committed referenced metadata, which is global for all operations in an application. With this cache hierarchy scheme, metadata that is modified and currently uncommitted is only visible to the session that performed the modification until the modification is committed. At the time a nested transaction is committed, the metadata changes caused by the nested transaction become visible to the transaction in which it was nested. At the time an outermost transaction is committed, the metadata changes caused by the transaction become visible to all other sessions.

Since the cache hierarchy involves caches, appropriate paging algorithms may be used to page out old data. An example of a paging algorithm that may be used to page out old metadata from the committed cache is the Least Recently Used (LRU) paging algorithm. Due to efficiency considerations, data stored in the uncommitted cache of the various sessions would typically not be paged out.

How these various levels of cache are used to provide a transaction aware cache of metadata shall be described in greater detail hereafter.

The Committed Cache

Referenced object metadata that has already been committed to the database is placed in the committed cache. For example if an operation, session, or transaction references committed metadata, that referenced metadata is placed in a committed cache such as 430 or 460. The inserting of referenced committed metadata is discussed in more detail hereinafter.

Committed caches 430 and 460 cache metadata that has been committed to the database managed by database server 105. For example, assume that a transaction TX5 changes a filename of document X from "joe.doc" to "fred.doc". If committed cache 430 stores the filename of document X before TX5 commits, then it would store the name "joe.doc". If committed cache 430 stores the filename of document X after TX5 commits, then it would store the name "fred.doc".

Committed caches 430 and 460 are shared by all sessions that use the respective DB file servers 408a and 408b. In other words, committed cache 430 is used to supply committed metadata to all sessions that use DB file server 408a, and committed cache 460 is used to supply committed metadata to all sessions that use DB file server 408b.

Uncommitted Caches

In addition to the committed caches, uncommitted caches are used for caching uncommitted modified metadata where one uncommitted cache is associated with each session. Examples of uncommitted caches in FIG. 4 are 410, 420, 440, and 450.

An uncommitted cache corresponds to a session and contains metadata that has been modified, but not yet committed, by the corresponding session. For example, if session 1 modifies metadata for a document, an entry for the modified metadata is placed in the uncommitted cache associated with session 1 (hereinafter referred to as the "session 1 uncommitted cache"). If session 1 reads the modified metadata, the uncommitted cache of session 1 is used to store the modified version of the metadata. Only session 1 sees the modified uncommitted metadata that is stored in the session 1 uncommitted cache.

According to one embodiment, different uncommitted caches are used for different kinds of metadata. Therefore, if a particular session is operating on two kinds of metadata, then there will be two uncommitted caches (one for each kind of metadata the session is operating on) associated with that particular session.

Transaction Frames

According to one embodiment, uncommitted caches can support nested transactions by including one "frame" for each level of a nested transaction. An example of a nested transaction is where a first transaction TX1 (hereinafter referred to as an "outer transaction") starts and, as transaction TX1 is executing, a second transaction TX2, which is inside of transaction TX1, begins.

Each transaction frame contains uncommitted metadata that has been modified by a transaction that belongs to a particular level within a nested transaction. For example, when the first transaction TX1 begins in a session, the uncommitted cache for that session contains a frame for TX1 (the "TX1 frame"). When the second transaction TX2 begins, the uncommitted cache is extended to have a second frame (a "TX2 frame"). An uncommitted cache is extended with an additional frame for each additional level of transaction nesting.

Session 4 uncommitted cache 450 is an example of an uncommitted cache with two frames, TX1 451 and TX2 452. Session 1 uncommitted cache 410 and session 3 uncommitted cache 440 are examples of uncommitted caches for non-nested transactions. Session 2 uncommitted cache 420 along with TX1 frame 421 is an example of an uncommitted cache for a nested transaction where only the outermost transaction is currently executing.

Using the Cache Hierarchy

Instead of retrieving metadata from a database each time a user performs an operation that accesses metadata, the metadata is cached in the cache hierarchy to provide faster access to the metadata. As a part of caching metadata, the metadata is inserted into one of the caches in the cache hierarchy in the form of a "metadata entry". The specific format of the metadata entries may vary from implementation to implementation. According to one embodiment, an attribute metadata entry for a database object has two components: (1) an ID identifying the database object and (2) the metadata for the database object. Just as the format of a metadata entry may vary from implementation to implementation, the data structure used to store the metadata entries may also vary from implementation to implementation. For example, the metadata entries may be stored in a non-volatile "table" that includes an "ID column" for storing the ID component of a metadata entry and a "metadata column" for storing the metadata component of a metadata entry.

According to one embodiment, when a session participant requires attribute metadata for a particular object (the "target object"), the cache hierarchy is searched for the metadata. If a usable version of the metadata does not reside in the cache hierarchy, then the metadata is obtained from the database. After obtaining the metadata from the database, the metadata is loaded into the appropriate level of the cache hierarchy so that it does not have to be retrieved from the database for subsequent operations.

Cache Hierarchy Search Order

According to one embodiment, when a session participant requests to be supplied metadata that is associated with a target object, the various caches in the cache hierarchy are searched in a particular order to provide the metadata. The search order depends on a few factors. The factors that determine the search order of the caches may include the following:

1) whether the operation is a part of a session or transaction;
2) whether a transaction is nested; and
3) the levels of transaction nesting.

One technique is to start searching at the "top of the cache hierarchy" and to use the first metadata entry found that satisfies the request. What constitutes the "top of the cache hierarchy" depends on the three factors listed above. The following are examples of searching for a metadata entry and which clarify the meaning the top of the cache hierarchy in the context of the above three factors.

In the case that the operation is performed within a session, and the operation is performed as part of a non-nested transaction or outermost transaction, the following search order is used:

1) the uncommitted cache;
2) the committed cache; and
3) the database.

In this example, the uncommitted cache is the top of the cache hierarchy.

If an operation is not part of a session or transaction, then the search order is:

1) the committed cache; and
2) the database.

In this example, the committed cache is the top of the cache hierarchy.

If the operation is performed within a nested transaction, the uncommitted cache is divided into frames that correspond to each level of nesting. For example where transaction TX2 is nested inside of transaction TX1 the following search order is used:

1) the TX2 frame;
2) the TX1 frame;
3) the committed cache; and
4) the database.

In this example, the TX2 frame is the top of the cache hierarchy.

If a transaction has additional levels of nesting, then the cache hierarchy grows upwards with an additional frame for each level of transaction nesting. Therefore, the search order reflects the level of transaction nesting and the associated frames. The top of the cache hierarchy would be the transaction frame associated with the innermost nested transaction that is currently executing.

Figure 3A:
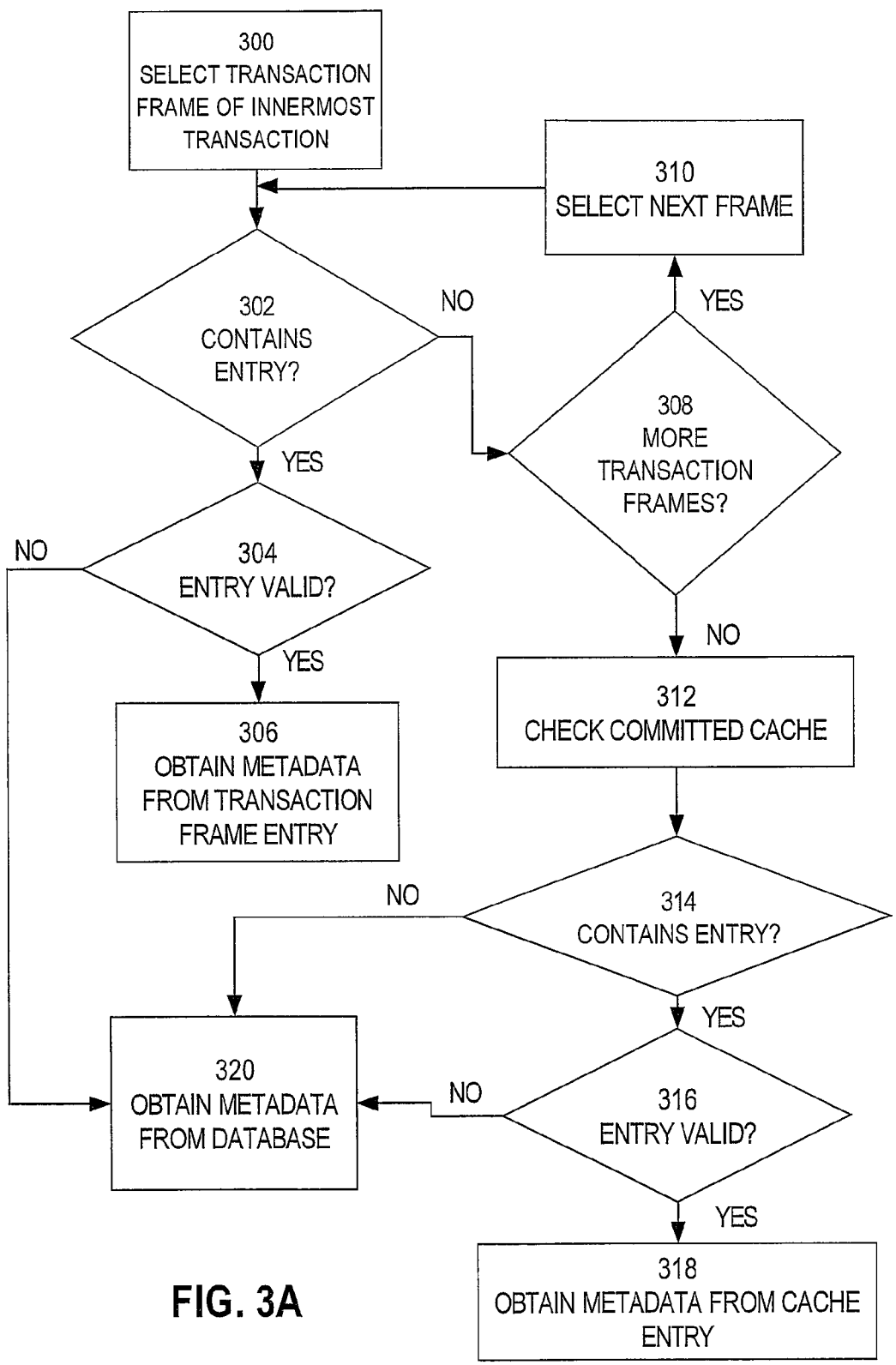
FIG. 3A is a flowchart illustrating steps of searching for attribute metadata in a hierarchical cache.

According to one embodiment, an invalid cache entry for the object may be encountered during the search for the object. The use of invalid entries shall be described in greater detail hereafter. According to one embodiment, when an invalid entry is encountered, further searching of the cache hierarchy is halted, and the desired metadata is requested directly from the database server. FIG. 3A is a flowchart that illustrates the steps for searching for attribute metadata according to an embodiment of the invention.

Referring to FIG. 3A, the search begins at the transaction frame of the innermost transaction (step 300). At step 302, it is determined whether the transaction frame that is currently being searched has an entry for the target object. If the current transaction frame has an entry for the target object, then control proceeds to step 304, otherwise control proceeds to step 308.

At step 304, it is determined whether the entry is valid. If the entry is valid, then at step 306 the desired metadata is obtained from the entry. Otherwise, control proceeds to step 320 where the metadata is retrieved from the database.

If the current transaction frame does not contain an entry for the target object, then at step 308 it is determined whether there are any more transaction frames. If there are any more transaction frames, then control proceeds to step 310 and the next frame (going from innermost to outermost) is selected. Control then passes back to step 302, where the process above is repeated for the new current frame.

If none of the transaction frames in the uncommitted cache has an entry for the target object, then control passes to step 312 and the committed cache is checked for an entry for the target object. If the committed cache does not contain an entry (step 314) or contains an invalid entry (step 316), then the desired metadata is obtained from the database (step 320). If the committed cache contains a valid entry for the target object, then the desired metadata is obtained from the committed cache entry (step 318).

Creating Valid Cache Entries

As explained above, metadata is retrieved from the database when either (1) there was no entry for the target object in the cache hierarchy, or (2) an invalid entry was encountered during a search of the cache hierarchy. In either case, it may be desirable to place the metadata retrieved from the database into the cache hierarchy so that subsequent reads of the data can be performed without having to once again involve the database.

According to one embodiment, the rules that govern where, within the cache hierarchy, to place the metadata obtained from the database, are as follows: (1) If the metadata was retrieved from the database because the cache hierarchy did not have any entry for the target object, then the retrieved metadata is stored in a new entry of the committed cache; and (2) if the metadata was retrieved because an invalid entry for the target object was encountered, then the retrieved metadata is cached at the same level in the hierarchy at which the invalid entry was encountered, and the invalid entry for the target object is removed from that level.

For example, assume that a transaction TX2, which is nested in TX1, requires metadata associated with a file F1. Assume that during the search of the cache hierarchy, the transaction frame for TX2 did not have any entry for F1, and the transaction frame for TX1 had an invalid entry for F1. As a result, the metadata of F1 is retrieved from the database, and stored in the transaction frame for TX1. The invalid entry for F1 is removed from the transaction frame for TX1. According to one embodiment, the steps of storing the new entry and removing the old entry can be consolidated by inserting the newly retrieved metadata into the existing invalid entry and marking that entry as "valid".

According to one embodiment, populating a new metadata entry includes the following steps:

(1) placing the ID for the target object in the ID column; and (2) placing the metadata in the metadata column.

As shall be explained hereafter, the second step may involve multiple sub-steps, as is the case with path metadata. How the second step is expanded for folder path metadata is described in the "Scenarios for Transaction-aware Caching of Path metadata" section below.

Creating Invalid Entries

According to one embodiment, when metadata is modified in a session, an invalid entry for the object associated with the metadata is inserted into the cache hierarchy. According to one embodiment, an invalid entry has the same form as a valid entry, but has an "invalid entry indicator" as the metadata column value.

The level at which the invalid entry is inserted is the level at which the modification was made. When an invalid entry is added at a particular level in the cache hierarchy, any valid entry associated with the same object is removed from that level. The steps of (1) adding an invalid entry and (2) removing a valid entry may be consolidated by replacing the metadata column value of the valid entry with the "invalid entry indicator" value.

For example, if a transaction TX1 modifies the metadata of file F1, then an invalid entry for F1 is placed in the transaction frame of TX1. If a transaction TX2, which is nested in TX1, modifies the metadata of F1, then an invalid entry for F1 is also placed in the transaction frame of TX2.

According to one embodiment, when an outermost transaction in a session commits, then an invalid entry is added to the committed cache for each of the objects whose metadata had been changed by the transaction. In another embodiment, when an outermost transaction in a session commits, then the entry is removed from the committed cache for each of the objects whose metadata had been changed by the outermost transaction. The process of adding invalid entries to the committed cache in response to the committing of a transaction is described hereafter in greater detail.

Collapsing Frames when a Nested Transaction Ends

When a nested transaction, such as transaction TX2, successfully completes, the frame for that nested transaction is "collapsed" into the frame of the transaction in which the completed transaction is nested. For example when TX2 transaction successfully completes, the TX2 frame (TX2 452) is collapsed into the TX1 frame (TX1 451).

Two possible techniques for "collapsing" one frame (TX2) into another frame (TX1) are: (1) copying metadata entries from the TX2 frame to the TX1 frame; and (2) invalidating metadata entries in the TX1 frame that correspond to entries that were in the TX2 frame.

For the sake of example, assume that a TX2 transaction has ended and therefore TX2 452 frame is collapsed into the corresponding TX1 451 frame. This "collapsing" of the TX2 452 frame may be performed according to the steps illustrated in FIG. 3B.

Figure 3B:
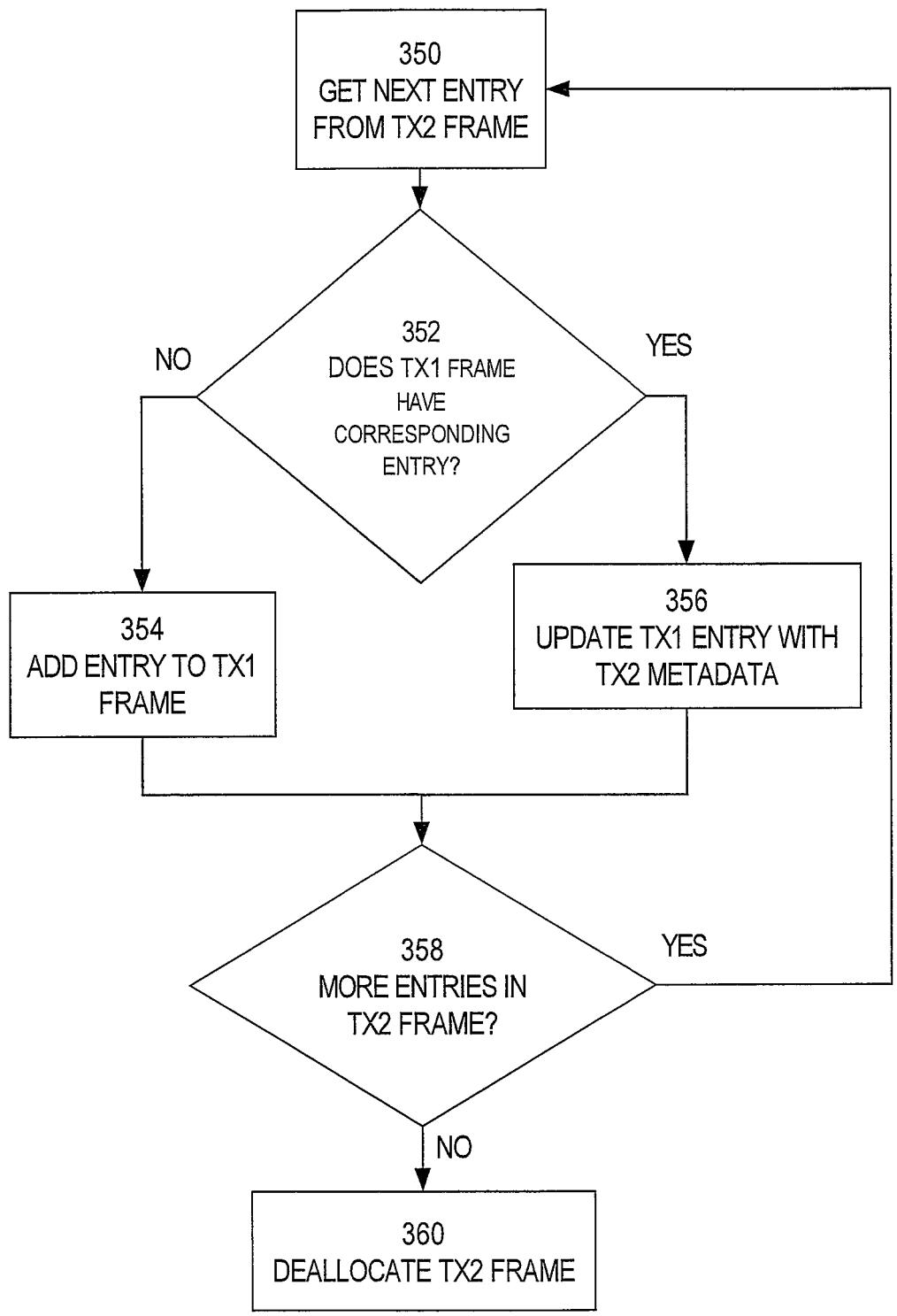
FIG. 3B is a flowchart illustrating steps for collapsing entries from the frame of a nested transaction into the frame of the transaction in which it is nested.

Referring to FIG. 3B, steps 350 and 358 form a loop to cause each entry within the TX2 frame to processed. At step 352, the currently selected entry of the TX2 frame is processed by determined whether the TX1 frame has a metadata entry that corresponds to the currently selected TX2 entry. The TX1 frame has a metadata entry that corresponds to the currently selected TX2 entry if, for example, the currently selected TX2 entry is for a particular file object, and the TX1 frame has a metadata entry for that same file object.

If the TX1 frame has a metadata entry that corresponds to the currently selected TX2 entry, then at step 356 the corresponding entry in the TX1 frame is updated with the metadata from the selected TX2 entry. If the TX1 frame does not have a metadata entry that corresponds to the currently selected TX2 entry, then at step 354 an entry is added to the TX1 frame with the information from the currently selected TX2 entry.

When all of the entries in the TX2 frame have been processed, the TX2 frame is deallocated at step 360.

In the embodiment described in FIG. 3B, the collapsing is performed by copying the metadata information from the frame that is being collapsed. In an alternative embodiment, the collapsing may be performed by invalidating the corresponding metadata entries of TX1. Such an embodiment would follow the steps illustrated in FIG. 3B, except that in step 354 the entries added to the TX1 frame would contain the invalid entry indicator rather than metadata values, and in step 356 the corresponding TX1 entry would be invalidated by storing the invalid entry indicator in the entry.

Collapsing the Uncommitted Cache when Committing Modified Metadata to Database When the metadata changes made in the session are committed to the database, the uncommitted cache for that session is collapsed and the metadata entries in the uncommitted cache are used to invalidate metadata entries with the same ID in the committed cache. For example, if session 1 ends and a metadata entry with ID 124 is in both the Session 1 uncommitted cache 410 and the committed cache 430, then the metadata entry with ID 124 is invalidated in the committed cache 430. However, if a metadata entry with ID 124 is in the Session 1 uncommitted cache 410 and there is no metadata entry with ID 124 in the committed cache 430, then nothing in the committed cache 430 is changed.

Another technique is to "patchup" the metadata entries in the committed caches using the metadata in uncommitted caches when a session or transaction ends. The patchup technique would involve updating the committed cache based on the entries in the uncommitted cache when the transaction associated with the uncommitted cache is committed. However, invalidating metadata entries is easier than "patching up" metadata entries in a committed cache, which requires synchronizing changes between multiple sessions and/or transactions and dealing with potential race conditions as these sessions and/or transactions are ending.

Committed Event

According to one embodiment, when a transaction that has changed metadata is committed, a "committed event" is posted for every metadata entry in the uncommitted cache of the transaction. This commit event is sent to all uncommitted caches and all committed caches in the system. For example, referring again to FIG. 4, when the transaction associated with session 3 commits, DB File Server 408a is informed by DB file server 408b about each of the metadata entries in uncommitted cache 440. Based on this information from DB file server 408b, DB file server 408a is informed of all of the metadata that was updated in session 3. Consequently, DB file server 408a invalidates any corresponding entries it may have for this metadata, since such entries will contain outdated metadata values.

As another example, if session 1 in DB file server 408a commits and metadata entries 124 and 125 reside in Session 1 uncommitted cache 410, then two committed events, one for metadata entry 124 and a second for metadata entry 125, are posted. To perform such a posting, a service is provided for broadcasting the committed events to other DB File Servers that cache metadata for files that reside in the same database. The database may or may not be used as an intermediary in performing the broadcast of the committed events.

Permissions Metadata

In general, "permissions" are constructs used to indicate which users can perform which operations. For example, in systems that manage files, the permissions may indicate that one user is allowed to read and write to a file, that another user is allowed to only read the file, and that yet another user is not even allowed to know that the file exists. The metadata that indicates the permissions that have been established in a system is referred to herein as permissions metadata.

Permissions metadata may take many forms, and may vary from implementation to implementation. One technique for managing permissions in a system with large numbers of files and large number of users involves the use Access Control Lists (i.e., ACLs), groups and Access Control Entries (i.e., ACEs). While the permissions metadata caching techniques described herein are described relative to embodiments that employ ACLs, ACEs and groups, the techniques are not limited to any particular type of permissions mechanism or metadata.

In systems that manage permissions using "groups", ACEs and ACLs, the term "group" typically generally refers to a list of one or more users and/or other groups. For example, a group G1 may list users Joe, Bob and Claire. An ACE is an association between a user or group and a set of permissions. For example, a particular ACE may associate group G1 with Read and Write permissions.

An ACL is a construct that contains one or more ACEs. According to one embodiment, an ACL is a file system object. Since file system objects are typically associated with an ID, an embodiment shall be described in which each ACL is associated with an ID. Therefore, a notation shall be used herein in which "ACL 126" means an ACL with an ID of 126. For the purpose of explanation, various examples shall be given hereafter that refer to an ACL 126 that is associated with two ACE's (ACE 1 and ACE 2) and with two groups (1261 and 1262). Specifically, ACL 126 includes the following:

1) ACE 1:
   a) Group 1261, which contains the following users:
     Joe
     Bob
     Claire
   b) the following permissions are associated with group 1261:
     R, W 2) ACE 2:
 a) Group 1262, which contains the following users:
  Joe
  Sally
  Moe
 b) the following permissions are associated with group 1262:
  W, D, L In the preceding example, the permissions abbreviations R, W, D and L respectively mean read permission, write permission, delete permission and lock permission.

The permissions that a particular user has relative to a file are typically determined by "resolving" the ACLs that govern access to file, as shall be described in greater detail hereafter.

Resolving Access Control Lists

The process of determining what permissions are granted by a particular ACL is referred to herein as "resolving" the ACL. The process of resolving an ACL may be complicated by the fact that a particular user may be associated with more than one ACE in the same ACL, either explicitly or by virtue of that user's membership in one or more groups referenced by ACEs in the same ACL.

In ACL 126, for example, Joe is in both groups 1261 and 1262. Therefore, the permissions for Joe are resolved to be R, W, D, L. In other words, Joe has read, write, delete, and lock permissions for objects controlled by ACL 126.

Transaction-Aware Caching of Permission Metadata

Just as caching attribute metadata for files managed by a database system may enhance the performance of a file system, caching permission metadata associated with ACLs may also enhance the performance of the system. Specifically, an ACL may be resolved by a database server in response to a first operation requested on a file governed by the ACL. At the time that the ACL is first resolved, the permission metadata associated with the resolved ACL may be cached outside the database server. Consequently, when a second operation is requested on a file governed by the ACL, the cached permission metadata may be inspected, without involving the database server, to determine the permissions granted by the ACL.

According to one embodiment, a hierarchy of caches may be used to store the permissions metadata outside the database server, similar to the hierarchy of caches described above relative to attribute metadata. Specifically, when an ACL is first resolved, an entry for the ACL may be stored in a shared committed cache. If a session performs an operation that changes the permission information associated with a resolved ACL, then an invalid entry for the ACL is placed in the uncommitted cache for the session. If the session involves nested transactions, frames may be used for each level of nesting, as described above. The techniques described above for collapsing frames when nested transactions are completed, and collapsing uncommitted caches when a transaction within a session commits, also apply equally to the context of permission metadata caches.

According to one embodiment, permission metadata cache entries differ from attribute metadata cache entries in that (1) each permissions metadata cache entry is associated with an ACL and (2) includes subentries associated with each user associated with the ACL. For example, in the cache entry for ACL 126, the ID column would include the identifier "126", while the metadata column would include the following information:

| User ID | Set of Permissions |
|---|---|
| Joe | R, W, D, L |
| Bob | R, W |
| Claire | R, W |
| Sally | W, D, L |
| Moe | W, D, L |

This information is herein referred to as "permissions associated with the ACL" or, more simply, the "permissions of the ACL".

Invalidating Permissions Metadata

As mentioned above, an invalid cache entry for an ACL is placed in the uncommitted cache of a session when the session performs an operation that causes a change to the permissions of the ACL. The permissions of an ACL may be changed both directly and indirectly. The permissions of an ACL may be modified directly, for example, by adding an ACE to the ACL. For example assume that ACE 3 contains the following:

a) Group 1263, which contains the following users:
 Brenda
 Ryan
 Sally
 b) the following permissions are associated with group 1263:
 R, W If ACE 3 is added to ACL 126, ACL 126 will have the following permissions:

| User ID | Set of Permissions |
|---|---|
| Joe | R, W, D, L |
| Bob | R, W |
| Claire | R, W |
| Sally | R, W, D, L |
| Moe | W, D, L |
| Brenda | R, W |
| Ryan | R, W |

The bold print shows the changes made to the permissions of ACL 126 in response to the addition of ACE 3 to ACL 126. Because the addition of ACE 3 to ACL 126 changes the permissions associated with ACL 126, an invalid entry for ACL 126 would be placed in the uncommitted cache of the session that adds ACE 3 to ACL 126.

The permissions associated with an ACL may also be changed indirectly by changing membership of any group that is associated with the ACL. For example assume that ACL 126 (which includes the previously described ACE 1 and ACE 2) is modified indirectly by modifying group 1261, which is associated with ACE 1 in ACL 126. For example, assume that group 1261 is modified by adding another group 1264 to group 1261, where group 1264 contains the following users:

Letty
Toni

After group 1264 is added to group 1261, the permissions associated with ACL 126 will be:

| User ID | Set of Permissions |
|---------|--------------------|
| Joe     | R, W, D, L         |
| Bob     | R, W               |
| Claire  | R, W               |
| Sally   | W, D, L            |
| Moe     | W, D, L            |
| Letty | R, W         |
| Toni  | R, W         |

The bold print shows the changes that are made to the permissions of ACL 126 when group 1264 is added to group 1261.

Changing a single group may affect the permissions of many ACLs. Specifically, the permissions represented by all ACLs associated with a particular group may be affected by a change in the membership of the group. Therefore, when a session changes a group, all permission data for all ACLs that include the modified group are invalidated in the uncommitted cache of the session. When a group is modified, the database server may have to be accessed to determine which ACLs are affected by the modification to the group.

Cached Permissions Metadata Example

The following is an example of a cache hierarchy where the uncommitted cache of a session ("session 1") includes entries for ACL 126 and ACL 127. The shared committed cache, on the other hand, includes entries for ACL 126 and ACL 128. The entry for ACL 126 in the uncommitted cache of session 1 includes, in bold, modifications made to ACL 126 (directly or indirectly) within session 1. Because the transaction that made the changes in session 1 has not committed, the changes are not reflected in the entry for ACL 126 in the committed cache. Note that, for each entry, the information contained in the metadata column is itself a table having "User ID" and "Set of Permissions" columns.

Session 1 uncommitted cache

| ID  | Metadata  |                     |
|-----|-----------|---------------------|
| 126 | User ID   | Set of Permissions  |
|     | Joe       | R, W, D, L          |
|     | Bob       | R, W                |
|     | Claire    | R, W                |
|     | Sally     | R, W, D, L          |
|     | Moe       | W, D, L             |
|     | Brenda| R, L            |
|     | Ryan  | R, L            |
| 127 | User ID   | Set of Permissions  |
|     | Frank     | W, D                |
|     | Elmo      | W, D                |

Committed cache

| ID  | metadata |                     |
|-----|----------|---------------------|
| 126 | User ID  | Set of Permissions  |
|     | Joe      | R, W, D, L          |
|     | Bob      | R, W                |
|     | Claire   | R, W                |
|     | Sally    | W, D, L             |
|     | Moe      | W, D, L             |
| 128 | User ID  | Set of Permissions  |
|     | Mark     | R                   |
|     | James    | R                   |

Given the state of the Session 1 uncommitted cache and the committed cache depicted above, assume that Session 1 is checking whether or not Brenda can read document 138, which is associated with ACL 126. To determine whether Brenda can read document 138, the session 1 uncommitted cache is first searched for ACL 126. ACL 126 is found in the session 1 uncommitted cache. The entry for ACL 126 in the session 1 uncommitted cache is searched for permissions relating to Brenda. Brenda is found and the set of permissions "R, L" for Brenda is retrieved. Therefore, it is determined that Brenda has read permission for document 138.

As another example, assume that Session 1 is checking whether Mark has permission to delete document 132, which is associated with ACL 128. To determine whether Mark can delete document 132, the session 1 uncommitted cache is first searched for ACL 128, but ACL 128 is not found in the session 1 uncommitted cache. Upon failing to find an entry for ACL 128 in the session 1 uncommitted cache, the committed cache is searched for ACL 128. An entry for ACL 128 is found in the committed cache, and the set of permissions "R" is retrieved for Mark. Therefore, Mark does not have delete permission for document 132. If ACL 128 had not been found in the committed cache, then the permissions associated with ACL 128 would have been retrieved from the database, and an entry containing the permissions for ACL 128 would have been placed in the committed cache.

Protecting Access to ACLs and ACEs

Since ACLs and ACEs are file system objects, ACLs and ACEs can also be used to determine which users have access rights to other ACLs and ACEs. For example, ACL 128 may be used to determine who has access rights to ACL 126. Assuming that ACL 128 grants the permissions illustrated above, if ACL 128 is used to indicate the access rights to ACL 126, then Mark and James have read access to ACL 126.

Folder Paths

Objects, such as documents, are commonly stored in hierarchical file systems. One technique to identify, locate, and/or access documents that are stored in hierarchical file systems involves the use of "folder paths". For example, a user may wish to access a document "foo1.java" based on a folder path such as "A1/A1-1/foo1.java". For the purpose of explanation, the "/" symbol shall be used herein as a delimiter between tokens in a folder path. However, the techniques described herein are not limited to any particular delimiter. Other examples of delimiters include, but are not limited to, "\" and "%".

When a database system is used to emulate a hierarchical file system, it is desirable to provide a mechanism by which the documents stored within the database may be accessed based on folder paths. According to one embodiment, the database system maintains folder information, and provides a mechanism by which objects may be accessed using folder paths, making it appear as if the objects are documents in a hierarchical file system.

Resolving Folder Paths

According to one embodiment, when an application (such as Protocol server 206A or 206B) attempts to access a document stored in a database managed by database server 105, a string, such as "A1/A1-1/foo1.java" is specified as a folder path to the requested document. The application evaluates the folder path represented by the string relative to a particular starting point in the folder hierarchy, which is often the root of the folder hierarchy. However, starting with the root is not necessary. To retrieve a document based on a folder path, the folder path associated with a document is first converted or "resolved" into an ID. The ID for the document is then used to retrieve the data for the document from the database.

According to one embodiment, the process of resolving a folder path into an ID involves (1) maintaining within the database an identifier for each folder and document, (2) parsing the folder path into tokens, and (3) iteratively querying the database based on the tokens, to eventually retrieve the ID for the document associated with the folder path.

For example, assume that an application is attempting to access the document specified by the folder path "A1/A1-1/foo1.java". Upon receipt of the folder path, the folder path is parsed and separated into the tokens "A1", "A1-1", and "foo1.java". The database is then queried to retrieve the identifier associated with A1. After obtaining the identifier associated with A1, the database is queried to retrieve the identifier associated with "A1-1" based on (1) the identifier for A1 and (2) the token "A1-1". After obtaining the identifier associated with A1-1, the database is queried to locate the ID for the "foo1.java" based on (1) the identifier for A1-1 and (2) the token "foo1.java". The token "foo1.java" is the last token in the folder path. Consequently, the ID for foo1.java is the identifier for the document specified by the folder path "A1/A1-1/foo1.java".

As is evident by this example, the process of resolving a folder path may require numerous queries to be submitted to a database server. The techniques described hereafter reduce the database server's involvement in the folder path resolution process by caching information about folder paths outside the database server, in a transaction-aware hierarchical caching system similar to those described above for caching attribute metadata and permissions metadata.

Folder Hierarchy Example

A folder path, such as "A1/A1-1/foo1.java" is one path to an item in an overall Folder hierarchy. For the purposes of illustration, a generic folder hierarchy, as depicted in Table 1 below, will be used in the examples given hereafter.

TABLE 1

| Folder Hierarchy |
| --- |
| /A1 |
| /A1-1/foo1.java |
| /A1-2/foo2.java |
| /A1-3 |
| /A1-3-1 |

According to one embodiment, each item, be it a folder or document in a folder hierarchy represents an object that is stored in a database. For example, A1, A1-1, A1-2, A1-3, A1-3-1, foo1.java and foo2.java represent objects that are stored in a database. The items have a hierarchical relationship to each other. For example, A1-1, A1-2, and A1-3 represent the children of A1, and A1-3-1 represents the child of A1-3 and the grandchild of A1. According to one embodiment, the database maintains a unique identifier for each item. For the purposes of illustration, assume that identifiers, as depicted in Table 2 below, are associated with various folders and documents depicted in Table 1.

TABLE 2

Identifiers associated with various objects of the folder hierarchy depicted in Table 1.

| Tokens | ID |
| --- | --- |
| A1 | 101 |
| A1-1 | 102 |
| A1-2 | 103 |
| A1-3 | 104 |
| A1-3-1 | 105 |
| foo1.java | 106 |
| foo2.java | 107 |

Transaction-Aware Caching of Path Metadata

To enhance performance of folder path resolution operations, information used to resolve the folder paths of objects that are stored in a database is cached outside the database in a cache hierarchy. According to one embodiment, each cache entry is associated with a folder, and stores "path metadata" for that folder.

In one embodiment, the path metadata for a particular folder includes information about the folder's immediate children, such as (1) the tokens associated with the folder's immediate children, and (2) the identifiers for the folder's children. In such an embodiment, for example, the cache entry for A1 could include (1) the tokens A1-1, A1-2, and A1-3 (which represent the children of A1) and (2) their respective identifiers 102, 103, and 104. Thus, the metadata column of a cache entry for a given folder may logically be represented as a table that contains a row for each of the folder's immediate children whose information has been resolved.

For the purposes of illustration, a document or folder object shall be referred to herein by the token that represents the object. For example, the folder object that A1 represents shall be referred to as folder A1, or simply A1.

According to one embodiment, path metadata is cached in a manner similar to that described above with respect to attribute metadata and permissions metadata. For example, when a session retrieves A1's path metadata from the database, the path metadata would be stored in a cache entry for A1. When a transaction performs an action that modifies A1's path metadata (e.g. deletes folder A1-1), an invalid cache entry for A1 is placed in an uncommitted cache frame associated with the session.

According to one embodiment, an empty folder (i.e. one that has no items) is indicated by leaving the metadata column empty. For example, leaving the metadata column for A1-3-1 empty indicates that there are no subfolders below A1-3-1.

One embodiment of how folder path metadata can be cached is illustrated in the examples given hereafter.

Operation of Folder Path Cache

The folder path caching example described in this section assumes that: (1) a folder hierarchy as depicted in Table 1 exists, (2) identifiers, as depicted in Table 2, are associated with the tokens of the folder hierarchy depicted in Table 1, (3) the cache does not initially contain any cached folder path metadata and (4) the file requests mentioned in the example are received within a session identified as "session 1".

Initially, session 1 issues a request that requires resolving the folder path "A1/A1-2/foo2.java". The string "A1/A1-2/foo2.java" is parsed into the following tokens:

A1

A1-2 foo2.java

Because session 1 has not previously modified the path metadata for any of the folders in the folder path, the uncommitted cache of session 1 will not contain entries for any of the folders. After failing to find the corresponding entries in the uncommitted cache of session 1, the committed cache is searched for the folder entries. For the purpose of illustration, it shall be assumed that the committed cache did not yet have entries for the folders. Consequently, the path metadata for the objects is retrieved from the database, and a cache entry is created in the committed cache for each of the referenced objects except for the last object.

Returning again to the example, folder path metadata is retrieved from the database, and cache entries for A1 and A1-2 are inserted into the committed cache. In the cache entry for A1, the ID of A1 is placed in the ID column of the cache entry, and the path metadata for A1 is placed in the metadata column of the cache entry. Similarly, in the cache entry for A1-2, the ID of A1-2 is placed in the ID column of the cache entry, and the path metadata for A1-2 is placed in the metadata column of the cache entry.

At this point, the cache entry for A1 contains path metadata that identifies only A1-2, even though A1 has other immediate children. As information about other immediate children of A1 is retrieved from the database, the cache entry for A1 is updated to include information about them as well. Specifically, when a previously unresolved child of A1 is resolved, metadata information about the child is stored in the metadata column of the cache entry for A1.

At this point, the committed cache is filled in as follows with information retrieved from the database:

Committed cache

| ID  | Metadata         |
| --- | ---------------- |
| 101 | <A1-2, 103>      |
| 103 | <foo2.java, 107> |

Next assume that session 1 renames A1-1 to A1-4 in a transaction that is not yet committed. This modification affects A1's path metadata. In response to this change, an entry for A1 is placed in the uncommitted cache of session 1. The entry identifies the affected folder by the unique ID 101, and includes an "Invalid Entry Indicator". At this point, the cache hierarchy may appear as follows:

Session 1 uncommitted cache

| ID  | Metadata              |
| --- | --------------------- |
| 101 | Invalid Entry Indicator |

Committed cache

| ID  | Metadata         |
| --- | ---------------- |
| 101 | <A1-2, 103>      |
| 103 | <foo2.java, 107> |

According to one embodiment, the cache entry for a particular folder is only invalidated if the folder's path metadata, as represented by the children of that folder, is modified. For example, an "Invalid Entry Indicator" was placed in the metadata column for A1 when A1-1 was renamed to A1-4. In contrast, if A1-3-1, which is a grandchild of A1, had been renamed, an invalid entry for A1 would not have been placed in the uncommitted cache of session 1. Instead, an invalid entry for A1-3, the immediate parent of A1-3-1, would have been placed in the uncommitted cache for session 1.

Next assume that session 1 attempts to resolve the folder path "A1/A1-4/foo1.java". Upon encountering the invalid entry for A1 in the session 1 uncommitted cache, the path metadata for A1 will be retrieved from the database. The entry for A1 in the session 1 uncommitted cache is then populated with the information retrieved from the database. In this example, after retrieving the path folder metadata of A1 from the database and populating the session 1 uncommitted cache entry for A1, the cache hierarchy may appear as follows:

TABLE 3

Session 1 uncommitted cache

| ID  | Metadata    |
| --- | ----------- |
| 101 | <A1-4, 102> |

Committed cache

| ID  | Metadata         |
| --- | ---------------- |
| 101 | <A1-2, 103>      |
| 102 | <foo1.java, 106> |
| 103 | <foo2.java, 107> |

According to one embodiment, the metadata column of the committed cache entry for a particular folder is only populated with information for the immediate children of the folder that have been referenced. For example, A1-2 is a child of A1, and A1-2 was previously referenced. Thus, A1-2 appears in the metadata column of the committed cache for A1 even though other children of A1 do not.

According to one embodiment, the metadata column of the uncommitted cache entry for a particular folder is populated with the immediate children of the particular folder that are referenced subsequent to the modification of path metadata for that particular folder. In this case, renaming A1-1 to A1-4 is a modification of A1's path metadata. The resolution of A1/A1-4/foo1.java is a reference to the previously modified path metadata of A1, thus, A1-4 appears in the metadata entry for A1 in the session 1 uncommitted cache.

According to one embodiment, when a database commit is performed within a session, a "commit event" is posted for every object that appears in the ID column of the uncommitted cache of the session. The commit event is sent to all other uncommitted caches, including transaction frames, and all committed caches in the system. For example, when the modifications for session 1 are committed, session 2 will receive a commit event and will invalidate entries in its uncommitted cache if the entries are impacted by the modifications performed by session 1. Likewise, entries in the committed caches will be invalidated if the entries are impacted by the modifications performed by session 1.

Folder Path Characteristics

Depending on the nature of the hierarchical file system for which folder path metadata is being cached, the caching of folder path metadata may involve taking account of characteristics that are not necessarily at issue with attribute metadata. For example, the objects in a folder path may be "multiply linked". For example, A1-2 is multiply linked to both A1 and B-1 if the same A1-2 can be reached not only through folder path "A1/A1-2" but also through folder path "B-1/A1-2".

Such multiple links must be taken into account when determining which cache entries are affected by an operation. For example, deleting A1-2 results in removing A1-2 from both A1 and B-1. Consequently, the deletion of A1-2 may cause an invalid cache entry for both A1 and B-1 to be placed in the uncommitted cache of the session that deletes A1-2.

Further, certain document access operations may bypass the path metadata caching mechanism. For example, one embodiment may allow a particular object to be accessed directly via the ID associated with the particular object, rather than through the resolution of a folder path. For example, if the ID of a document foo4.java is 110, then foo4.java may be accessed directly with the ID 110, thus bypassing path metadata caching.

Transaction-aware caching of path metadata provides for: (1) caching and invalidating on a per-object level of granularity, as opposed to caching and invalidating the entire folder path, and (2) reducing the overhead of caching the entire folder path while providing the same behavior that can be achieved with caching the entire folder path. Thus, even when the cache entry for a particular token has been invalidated, cache entries for tokens above the invalidated token, which are still valid, are still in the cache hierarchy and can still be used. Further, resolving the folder path using per token level caching is still fast even though the entire folder path may be spread across several cache entries.

Data Structures of the Hierarchical Cache

The caches used to carry out the techniques described herein may be implemented in a variety of ways. According to one embodiment, the caches are implemented as multi-level hash tables. For example, when resolving the path "/A1/A1-2", a hash table associated with A1 may be located by hashing the object ID (i.e. 101) of A1. Once the hash table associated with A1 is located, the entry for A1-2 may be located within the A1 hash table by hashing the token "A1-2". The entry for A1-2 would indicate the object ID (i.e. 103) of A1-2.

Although the examples provided herein depict caching path metadata in temporary tables or volatile storage, the actual form of the structure could vary from implementation to implementation.

Negative Cache Entries

In general, caches are used to temporarily store information that is permanently stored elsewhere. For example, in the description given above, caches store file system metadata, permission metadata, and/or path metadata, all of which can be retrieved from the database server. The information is cached to reduce the frequency that the database server must be used to retrieve the data. Thus, entries within such caches are "positive cache entries", in that the cache entries hold data retrieved in response to prior successful retrievals of data from the database server.

According to one embodiment, the caching techniques described herein are supplemented through the use of "negative cache entries". A negative cache entry is an entry that is stored in the cache in response to a failed attempt to retrieve data from the database server. Specifically, when the main repository indicates that it does not contain a specific piece of information, a "negative entry" is added to the cache to (1) identify the specific piece of information that was requested, and (2) indicate that the database server did not have the specific piece of information.

Negative entries can lead to a significant improvement in performance in situations where the same non-existent information is repeatedly requested. For example, assume that negative entries are used in the context of folder path metadata. Further assume that a client attempts to resolve the path "/A1/A1-X", and that the folder A1 does not have a child A1-X. Under these circumstances, the cache will attempt to retrieve information about A1-X from the database server, and the database server will indicate that A1-X is not a valid child of folder A1. Upon receiving the response from the database server, the cache may place a negative cache entry for A1-X in the cache. If a subsequent request attempts to resolve the same invalid path "/A1/A1-X", the cache will find the negative entry for A1-X, and generate a response to indicate that the path is invalid, without involving the database server.

Similar to positive cache entries, negative cache entries are invalidated when an action occurs that may cause the entries to be inaccurate. Specifically, an entry that indicates that certain information is missing is invalidated when an action is performed that may create the previously-missing information. For example, any action that could possibly create a subfolder A1-X for folder A1 would invalidate the negative cache entry for A1-X. Such actions include, for example, the renaming of an existing subfolder of A1, and the creation of a new subfolder within A1.

According to one embodiment, negative cache entries are handled in the same caches as positive cache entries. For example, when used in the context of folder path metadata, cache entries can be used in the committed cache, and in one or more transaction frames of the uncommitted cache of a session.

Under certain situations, the uncommitted cache may even have a negative cache entry for the same piece of information as the committed cache has a positive cache entry, and vice versa. For example, assume that, after a negative entry for A1-X is added to the cache entry for A1 in the committed cache, a particular session creates a subfolder A1-X under A1 in a transaction that is not yet committed. Under these conditions, an invalid entry indicator for A1 would be placed in the uncommitted cache for that session. When the session subsequently attempts to resolve the path/A1/A1-X, the cache will access the database upon encountering the invalid entry indicator, and will find A1-X in the database. Therefore, a positive entry for A1-X within the A1 cache entry will be placed in the uncommitted session cache for the session. At this point, the uncommitted session cache has a positive entry for A1-X, and the committed cache has a negative entry for A1-X.

On the other hand, assume that the committed cache has a positive entry for A1-X. Assume that a session deletes the A1-X folder. In response, the cache will place an invalid entry indicator for A1 in the uncommitted cache for the session. If the session then attempts to resolve the path/A1/A1-X, the cache will access the database, and be informed that A1-X does not exist. In response to this information, the cache will place a negative cache entry for A1-X in the uncommitted cache for the session. Thus, if the session again attempts to resolve/A1/A1-X, the cache may respond that A1-X does not exist without having to involve the database server.

Multiple Types of Caches

Figure 5:
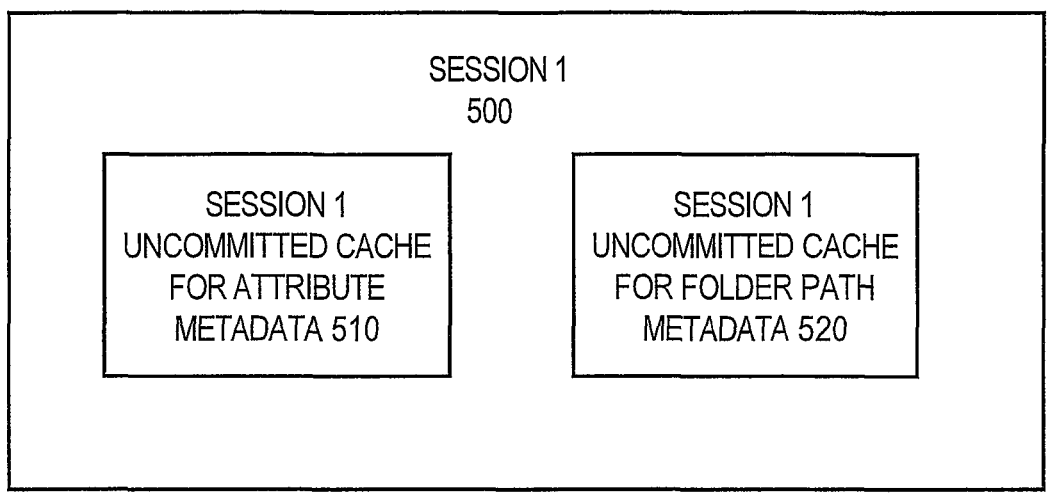
FIG. 5 is a block diagram of two different types of uncommitted caches associated with a particular session.

For any given session, there can be separate uncommitted caches for each different kind of metadata. For example, a session can have one uncommitted cache for caching attribute metadata, another uncommitted cache for caching permissions metadata, and yet another uncommitted cache for caching folder path metadata. FIG. 5 is a block diagram of two different types of uncommitted caches associated with a particular session. Specifically, session 1 500 has an uncommitted cache 510 for file system object metadata, and another uncommitted cache 520 for folder path metadata.

Hardware Overview

Figure 6:
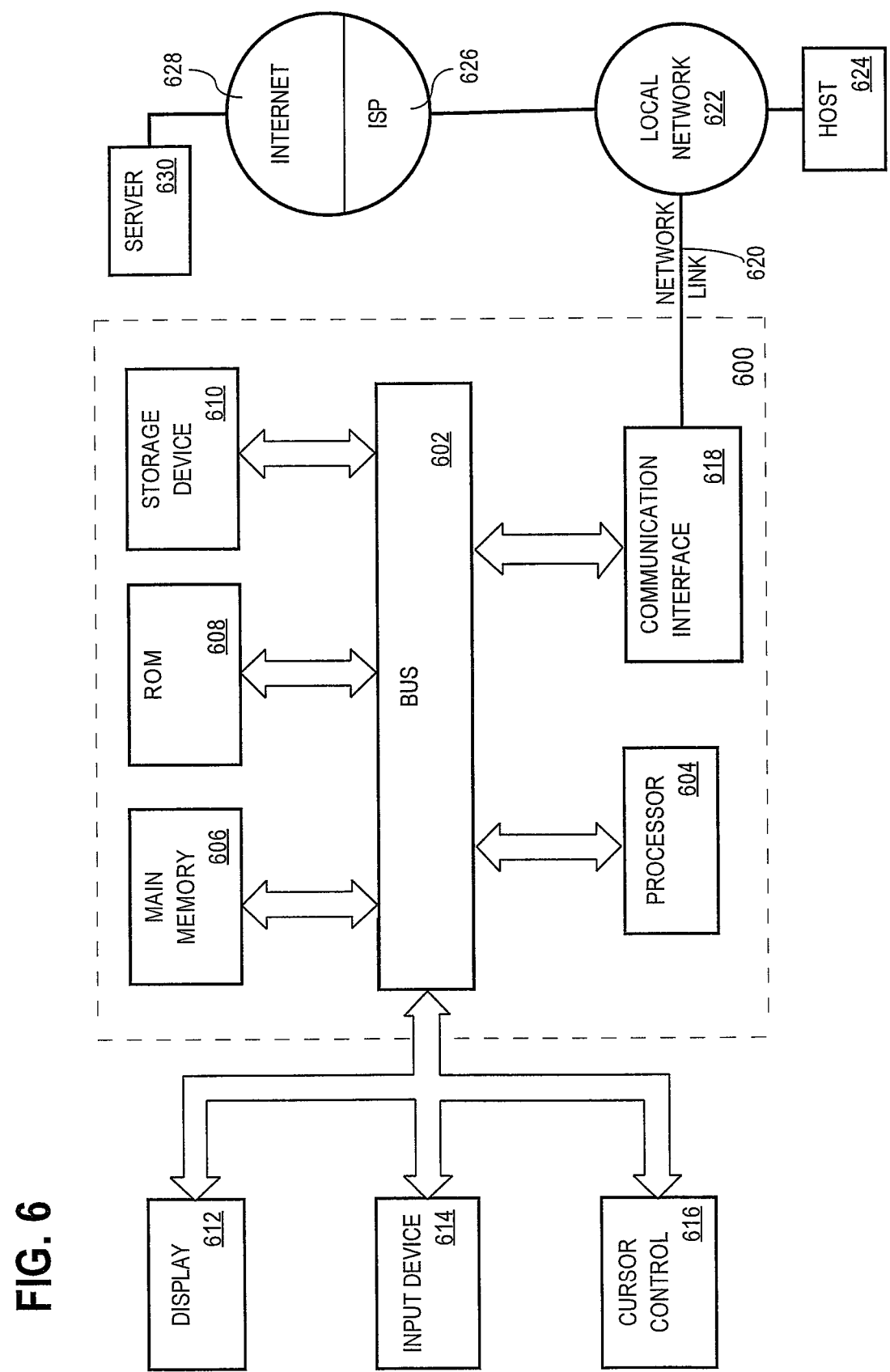
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining authorization to operate on a file, the method comprising computer-implemented steps of:
   receiving a request, associated with a session, for an operation on the file;
   looking in one or more session caches that are associated with said session for an entry that contains permissions metadata for said file;
   wherein said one or more session caches store a first set of permissions metadata that has been modified within said session but has not yet been committed for a transaction to a repository;
   wherein said permissions metadata for said file includes information that specifies which users can perform which operations on said file;
   wherein one or more sets of permissions metadata in said one or more session caches are posted to one or more shared caches in response to committing said one or more sets of permissions metadata, said one or more shared caches having entries that are accessible to multiple sessions;
   if said entry is not in said one or more session caches, then performing the steps of:
      looking for said entry in said one or more shared caches;
      wherein said one or more shared caches store a second set of permissions metadata that has been committed to the repository; and
      if said entry is not in said one or more shared caches, then obtaining said permissions metadata for said file from the repository that is different than said one or more session caches and said one or more shared caches; and
   using said permissions metadata for said file to determine whether said operation may be performed on said file;
   wherein the steps of the method are performed by one or more computer systems.

2. The method of claim 1 wherein said permissions metadata is modified directly.

3. The method of claim 1 wherein said permissions metadata is modified indirectly.

4. The method of claim 1 wherein said permissions metadata is for one or more users and said one or more users are associated with one or more groups.

5. The method of claim 1, wherein said permissions metadata is for one or more users and said one or more users are associated with one or more groups, wherein a particular user of said one or more users is associated with more than one group, and wherein the method further comprises computer-implemented step of:
   merging together all permissions metadata for said particular user from said more than one group.

6. The method of claim 1 wherein said entry for said one or more shared caches is populated when said permissions metadata is referenced.

7. The method of claim 1 wherein said entry has an ID column identifying said file and a metadata column containing said permissions metadata.

8. The method of claim 7 wherein said metadata column of said entry in said one or more session caches is populated with modified permissions metadata that was modified by said session.

9. The method of claim 7 wherein said ID column for said one or more session caches is populated when said permissions metadata is modified.

10. The method of claim 7 wherein said ID column for said one or more session caches is populated when said file is modified.

11. The method of claim 7 wherein said metadata column for said one or more session caches is populated when said file is referenced subsequent to said file being modified.

12. The method of claim 7 wherein said metadata column for said one or more session caches is populated when said permissions metadata is referenced subsequent to said permissions metadata being modified.

13. The method of claim 7 wherein said metadata column for said one or more session caches is populated when said file is referenced subsequent to said permissions metadata being modified.

14. The method of claim 7 wherein said metadata column for said one or more session caches is populated when said permissions metadata is referenced subsequent to said file being modified.

15. The method of claim 1, wherein said session is associated with a transaction, and wherein the method further comprises computer-implemented step of:
   invalidating said entries in said one or more shared caches when said transaction successfully terminates wherein said entries in said one or more shared caches are duplicates of entries in said one or more session caches.

16. A non-transitory computer-readable storage medium storing one or more sequences of instructions for determining authorization to operate on a file, which instructions, when executed by one or more processors, cause the one or more processors to perform:
   receiving a request, associated with a session, for an operation on the file;
   looking in one or more session caches that are associated with said session for an entry that contains permissions metadata for said file;
   wherein said one or more session caches store a first set of permissions metadata that has been modified within said session but has not yet been committed for a transaction to a repository;
   wherein said permissions metadata for said file includes information that specifies which users can perform which operations on said file;
   wherein one or more sets of permissions metadata in said one or more session caches are posted to one or more shared caches in response to committing said one or more sets of permissions metadata, said one or more shared caches having entries that are accessible to multiple sessions;

if said entry is not in said one or more session caches, then performing the steps of:
  looking for said entry in said one or more shared caches;
  wherein said one or more shared caches store a second set of permissions metadata that has been committed to the repository; and
  if said entry is not in said one or more shared caches, then obtaining said permissions metadata for said file from the repository that is different than said one or more session caches and said one or more shared caches; and
using said permissions metadata for said file to determine whether said operation may be performed on said file.

17. The non-transitory computer-readable storage medium of claim 16 wherein said permissions metadata is modified directly.

18. The non-transitory computer-readable storage medium of claim 16 wherein said permissions metadata is modified indirectly.

19. The non-transitory computer-readable storage medium of claim 16 wherein said permissions metadata is for one or more users and said one or more users are associated with one or more groups.

20. The non-transitory computer-readable storage medium of claim 16, wherein said permissions metadata is for one or more users and said one or more users are associated with one or more groups, wherein a particular user of said one or more users is associated with more than one group, and wherein the one or more sequences of instructions further comprise instructions which, when executed by the one or more processors, cause the one or more processors to perform the step of:
  merging together all permissions metadata for said particular user from said more than one group.

21. The non-transitory computer-readable storage medium of claim 16 wherein said entry for said one or more shared caches is populated when said permissions metadata is referenced.

22. The non-transitory computer-readable storage medium of claim 16 wherein said entry has an ID column identifying said file and a metadata column containing said permissions metadata.

23. The non-transitory computer-readable storage medium of claim 22 wherein said metadata column of said entry in said one or more session caches is populated with modified permissions metadata that was modified by said session.

24. The non-transitory computer-readable storage medium of claim 22 wherein said ID column for said one or more session caches is populated when said permissions metadata is modified.

25. The non-transitory computer-readable storage medium of claim 22 wherein said ID column for said one or more session caches is populated when said file is modified.

26. The non-transitory computer-readable storage medium of claim 22 wherein said metadata column for said one or more session caches is populated when said file is referenced subsequent to said file being modified.

27. The non-transitory computer-readable storage medium of claim 22 wherein said metadata column for said one or more session caches is populated when said permissions metadata is referenced subsequent to said permissions metadata being modified.

28. The non-transitory computer-readable storage medium of claim 22 wherein said metadata column for said one or more session caches is populated when said file is referenced subsequent to said permissions metadata being modified.

29. The non-transitory computer-readable storage medium of claim 22 wherein said metadata column for said one or more session caches is populated when said permissions metadata is referenced subsequent to said file being modified.

30. The non-transitory computer-readable storage medium of claim 16, wherein said session is associated with a transaction, and wherein the one or more sequences of instructions further comprise instructions which, when executed by the one or more processors, cause the one or more processors to perform the step of:
  invalidating said entries in said one or more shared caches when said transaction successfully terminates wherein said entries in said one or more shared caches are duplicates of entries in said one or more session caches.

* * * * *

UNITED STATES PATENT AND TRADEMARK OFFICE
CERTIFICATE OF CORRECTION

PATENT NO. : 8,745,017 B2  Page 1 of 1
APPLICATION NO. : 12/049212
DATED : June 3, 2014
INVENTOR(S) : Long et al.

It is certified that error appears in the above-identified patent and that said Letters Patent is hereby corrected as shown below:

In the Specification

In column 5, line 27, delete "then" and insert -- than --, therefor.

In column 18, line 54, delete "/foo1 java"." and insert -- /foo1.java". --, therefor.

In column 19, line 31, delete ""foo1 java"" and insert -- "foo1.java" --, therefor.

In column 19, line 33, delete "foo1 java" and insert -- foo1.java --, therefor.

Signed and Sealed this
Third Day of February, 2015

Michelle K. Lee
*Deputy Director of the United States Patent and Trademark Office*